(12) United States Patent
Lu (10) Patent No.: US 11,287,910 B2
(45) Date of Patent: Mar. 29, 2022

(54) MOUSE PAD DEVICE WITH CHARGING FUNCTION

(71) Applicants: DEXIN ELECTRONIC LTD., Guangdong (CN); DEXIN CORPORATION, New Taipei (TW)

(72) Inventor: Ho-Lung Lu, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 12 days.

(21) Appl. No.: 17/004,003

(22) Filed: Aug. 27, 2020

(65) Prior Publication Data

US 2021/0311568 A1    Oct. 7, 2021

(30) Foreign Application Priority Data

Apr. 7, 2020    (TW) .................................. 109111640

(51) Int. Cl.
| | |
|---|---|
| *H01M 10/46* | (2006.01) |
| *G06F 3/039* | (2013.01) |
| *F21V 8/00* | (2006.01) |
| *H02J 7/02* | (2016.01) |
| *H02J 7/00* | (2006.01) |
| *H02J 50/10* | (2016.01) |
| *H02J 50/40* | (2016.01) |

(52) U.S. Cl.
CPC ......... *G06F 3/0395* (2013.01); *G02B 6/0073* (2013.01); *H02J 7/0047* (2013.01); *H02J 7/02* (2013.01); *H02J 50/10* (2016.02); *H02J 50/402* (2020.01)

(58) Field of Classification Search
CPC .......... H02J 7/0047; H02J 7/02; H02J 7/0042; H02J 50/005; H02J 50/10; H02J 50/402; G06F 3/0395; G02B 6/0073
USPC ................................ 320/107, 108, 114, 115
See application file for complete search history.

(56) References Cited

U.S. PATENT DOCUMENTS

| | | | |
|---|---|---|---|
| 2011/0175567 A1* | 7/2011 | Kidakarn ................ | H02J 50/40 320/108 |
| 2015/0048687 A1* | 2/2015 | Wang ...................... | H02J 5/005 307/104 |
| 2015/0130406 A1* | 5/2015 | Jing ........................ | H02J 7/0042 320/108 |
| 2018/0351389 A1* | 12/2018 | Morier .................... | G06F 3/038 |
| 2020/0412157 A1* | 12/2020 | Vlasov .................... | G06F 3/038 |

FOREIGN PATENT DOCUMENTS

CN        106708296 A    *    5/2017   ............ G06F 3/039

* cited by examiner

*Primary Examiner* — Edward Tso
(74) *Attorney, Agent, or Firm* — Li & Cai Intellectual Property Office (57) ABSTRACT

A mouse pad device with a charging function including a mouse pad module, a charging module, and a shell module is provided. The mouse pad module includes a mouse pad body and a light guide unit. The charging module includes a control unit, a first light-emitting diode (LED) unit, a second LED unit, and a first wireless charging coil unit. The shell module includes a shell unit and an affixing unit. The first charging coil unit and the control unit are disposed in the shell unit, and the first LED unit and the second LED unit are disposed on two sides of the shell unit. The shell module is detachably fixed on an affixing area of the mouse pad body by utilizing the affixing unit.

10 Claims, 8 Drawing Sheets

MOUSE PAD DEVICE WITH CHARGING FUNCTION

CROSS-REFERENCE TO RELATED PATENT APPLICATION

This application claims the benefit of priority to Taiwan Patent Application No. 109111640, filed on Apr. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad device, and more particularly to a mouse pad device with a detachable charging module.

BACKGROUND OF THE DISCLOSURE

Despite the fact that wireless charging technology has matured in recent years, most wireless charging devices need to be disposed in a separate area, which significantly diminishes desktop simplicity for all kinds of desks.

Therefore, it has become an important matter for the industry to provide a mouse pad device integrating a wireless charging device with a mouse pad.

SUMMARY OF THE DISCLOSURE

In response to the above-referenced technical inadequacies, the present disclosure provides a mouse pad device with a charging function.

In one aspect, the present disclosure provides a mouse pad device with a charging function including a mouse pad module, a charging module, and a shell module. The mouse pad module includes a mouse pad body that is flat-shaped and a light guide unit that is surroundingly disposed on an edge of the mouse pad body. The light guide unit has a first light entering end and a second light entering end. The charging module receives a first voltage, and the charging module includes a control unit, a first light-emitting diode (LED) unit, a second LED unit, and a first wireless charging coil unit. The first LED unit is electrically connected to the control unit. The second LED unit is electrically connected to the control unit. The first wireless charging coil unit is electrically connected to the control unit. The shell module includes a shell unit and an affixing unit. The first wireless charging coil unit and the control unit are disposed in the shell unit, the first LED unit and the second LED unit are respectively disposed on two sides of the shell unit and the shell unit is detachably and fixedly disposed on an affixing area of the mouse pad body utilizing the affixing unit. When the shell module is disposed on the affixing area of the mouse pad body, the first LED unit and the second LED unit are respectively disposed at the first light entering end and the second light entering end of the light guide unit.

One of the advantages of the present disclosure is that the mouse pad module and the charging module of the mouse pad can be easily detached or changed, such that the convenience is effectively increased. Moreover, the LED units of the charging module and the light guide unit of the mouse pad module also enhance the enjoyment and the aesthetic appearance of the mouse pad device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
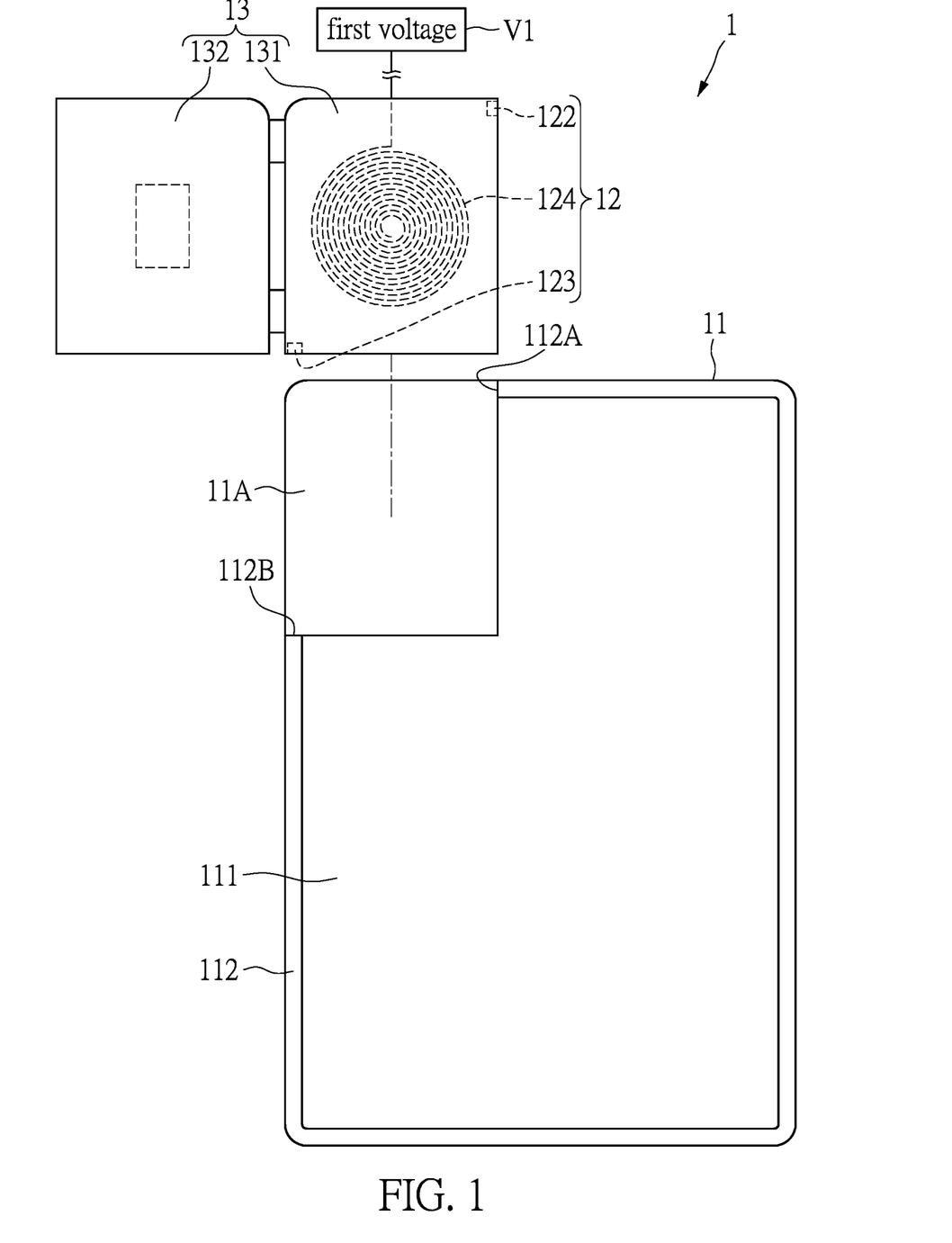
FIG. 1 is a schematic view of a charging module and a mouse pad module being detached from a mouse pad device in one embodiment of the present disclosure.
Figure 2:
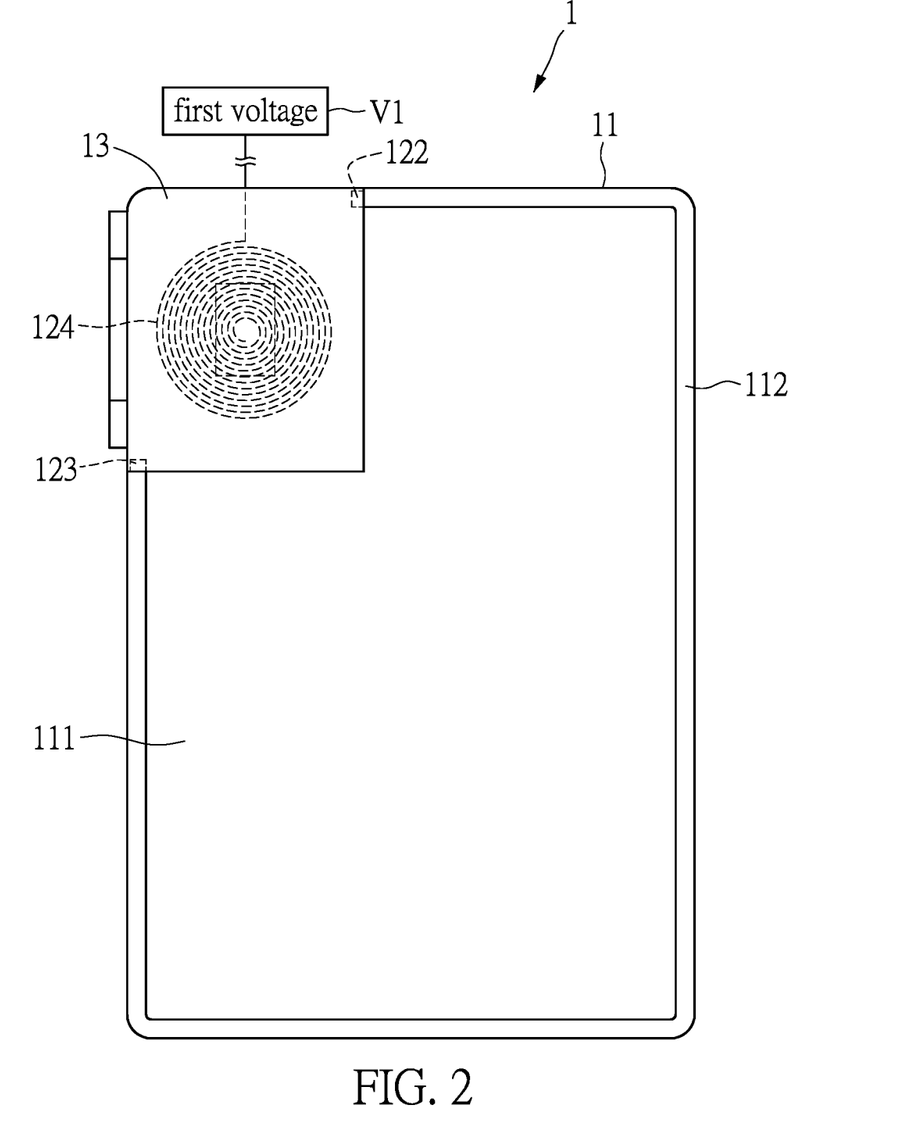
FIG. 2 is a schematic view of the charging module and the mouse pad module being disposed on the mouse pad device in one embodiment of the present disclosure.
Figure 3:
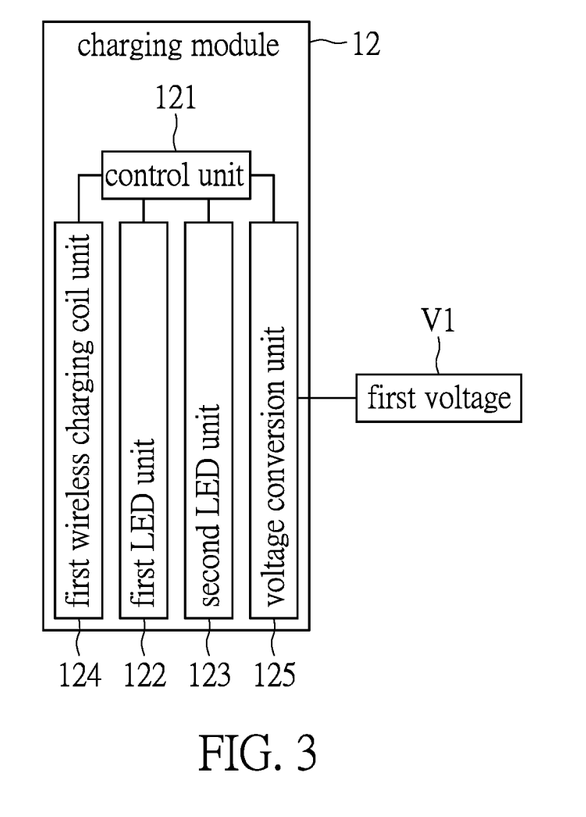
FIG. 3 is a block diagram of the mouse pad device in one embodiment of the present disclosure.
Figure 4:
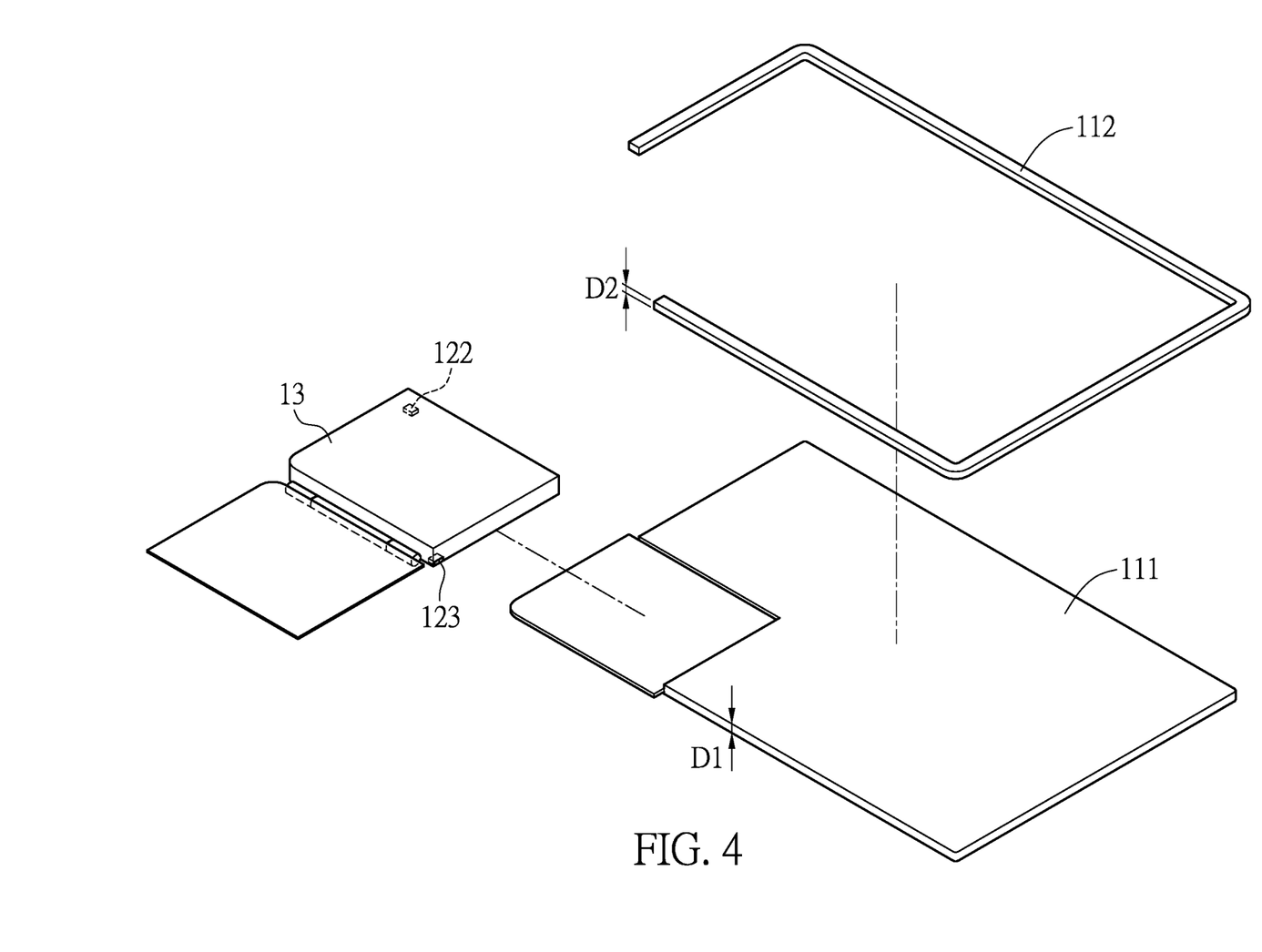
FIG. 4 is an exploded schematic view of the mouse pad module and a shell module in one embodiment of the present disclosure.
Figure 5A:
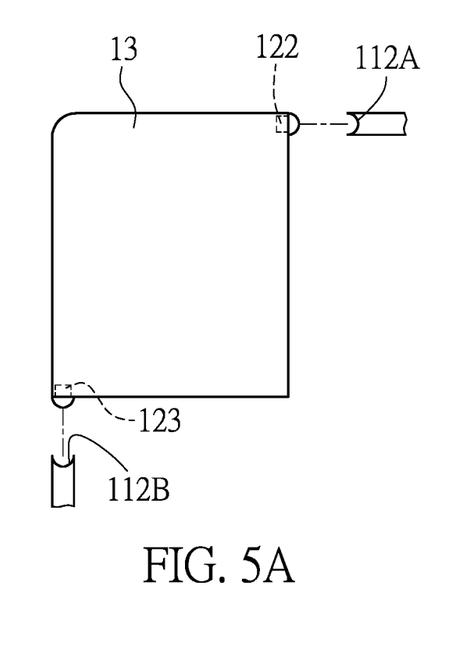
FIG. 5A, FIG. 5B and FIG. 5C are schematic views of the shapes of the first LED unit, the second LED unit, the first light entering end, and the second light entering end of the present disclosure.
Figure 5B:
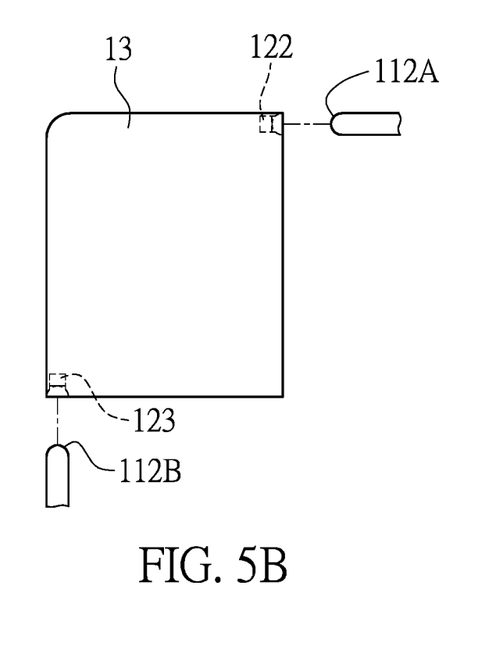
Figure 5C:
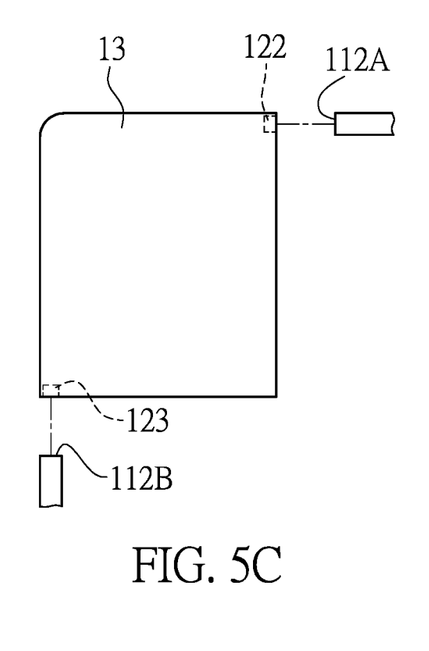

Reference is made to FIG. 1, which is a schematic view of a charging module and a mouse pad module being detached from a mouse pad device in one embodiment of the present disclosure. Reference is made to FIG. 2, which is a schematic view of the charging module and the mouse pad module being disposed on the mouse pad device in one embodiment of the present disclosure. Reference is made to FIG. 3, which is a block diagram of the mouse pad device in one embodiment of the present disclosure. Reference is made to FIG. 4, which is an exploded schematic view of the mouse pad module and the shell module in one embodiment of the present disclosure. Reference is made to FIG. 5A, FIG. 5B and FIG. 5C, which are schematic views of the shapes of the first LED unit, the second LED unit, the first light entering end, and the second light entering end of the present disclosure.

In this embodiment, the mouse pad device 1 includes a mouse pad module 11, a charging module 12, and a shell module 13. The mouse pad module 11 includes a mouse pad body 111 and a light guide unit 112.

As shown in FIG. 1 and FIG. 2, the charging module 12 is disposed on an affixing area 11A of the mouse pad body 111 of the mouse pad 11. In this embodiment, the affixing area 11A is located at a corner of the mouse pad body 111. In other embodiments, the affixing area 11A can be adjusted according to actual requirements, and the present disclosure is not limited thereto.

Referring to FIG. 3, the charging module 12 is used to receive the first voltage V1. The charging module 12 includes a control unit 121, a first LED unit 122, a second LED unit 123, a first wireless charging coil unit 124, and a voltage conversion unit 125. The control unit 121 is electrically connected to the first LED unit 122, the second LED unit 123, the first wireless charging coil unit 124, and the voltage conversion unit 125.

As shown in FIG. 4, the mouse pad body 111 is a flat and thin board. That is to say, the mouse pad body 111 has a first thickness D1. The light guide unit 112 is surroundingly disposed on an edge of the mouse pad body 111. That is to say, the light guide unit 112 has a second thickness D2. In this embodiment, the second thickness D2 of the light guide unit 112 is smaller or equal to the first thickness D1 of the mouse pad body 111. The light guide unit 112 is a light guide bar with transparent or translucent material. A plurality of light guide grains can be disposed in the light guide unit 112, so as to guide the light entering the light guide unit 112. A first light entering end 112A and a second light entering end 112B are disposed at two ends of the light guide unit 112.

The shell module 13 includes a shell unit 131 and an affixing unit 132. The shell unit 131 has an internal accommodating space. In this embodiment, the shell unit 131 has an upper shell (not shown in the figures) and a lower shell (not shown in the figures). The control unit 121, the first wireless charging coil unit 124, and the voltage conversion unit 125 of the charging module 12 are disposed in the shell unit 131. The first LED unit 122 and the second LED unit 123 are disposed on two adjacent sides of the shell unit 131. In other embodiments, the first LED unit 122 and the second LED unit 123 can be disposed on two opposite sides of the shell unit 131, and the present disclosure is not limited thereto. The first wireless charging coil unit 124 can receive power from the voltage conversion unit 125, and then transmit the power to an electronic device that is to be charged, e.g., a mouse, a cell phone, a wearable device, or a tablet computer. The voltage conversion unit 125 receives and then converts the first voltage V1 to at least one suitable voltage to be provided to the control unit 121, the first LED unit 122, the second LED unit 123, and the first wireless charging coil unit 124. For example, the voltage conversion unit 125 can convert the first voltage V1 into a wireless charging voltage, so as to be provided to the first wireless charging coil unit 124. The voltage conversion unit 125 can be a direct current (DC) to DC voltage conversion unit or an alternating current (AC) to DC voltage conversion unit, and the first voltage V1 can be a DC voltage or an AC voltage. When the first voltage V1 is the DC voltage, the voltage conversion unit 125 is able to receive voltage outputted from a power bank or the DC to DC voltage conversion unit.

The shell module 13 is fixedly disposed on the affixing area 11A of the mouse pad body 111 of the mouse pad module 11 utilizing the affixing unit 132. When the shell module 13 is disposed on the affixing area 11A of the mouse pad body 111, the first LED unit 122 and the second LED unit 123 are respectively disposed at the first light entering end 112A and the second light entering end 112B of the light guide unit 112. That is to say, the first LED unit 122 is aligned with the first light entering end 112A, and the second LED unit 123 is aligned with the second light entering end 112B.

Referring to FIG. 5A, the first light entering end 112A and the second light entering end 112B each has an incident surface with a groove, respectively, and the grooves accommodate the first LED unit 122 and the second LED unit 123. That is to say, in this embodiment, the first LED unit 122 and the second LED unit 123 protrude out of the shell unit 131. Moreover, the shapes of the grooves of the first light entering end 112A and the second light entering end 112B corresponds to the shapes of the first LED unit 122 and the second LED unit 123, so as to suitably accommodate the first LED unit 122 and the second LED unit 123.

Referring to FIG. 5B, the first light entering end 112A and the second light entering end 112B each has a protruding incident surface. The first LED unit 122 and the second LED unit 123 are disposed in the shell unit 131, and the shell unit 131 has two grooves that are disposed corresponding to the positions of the first LED unit 122 and the second LED unit 123. The shapes of the two grooves of the shell unit 131 correspond to the protruding incident surfaces of the first light entering end 112A and the second light entering end 112B, so as to suitably accommodate the first light entering end 112A and the second light entering end 112B.

In another embodiment, e.g., as shown in FIG. 5C, the first light entering end 112A and the second light entering end 112B can each be disposed with a flat incident surface, so that light emergent surfaces of the first LED unit 122 and the second LED unit 123 are required to be designed as flat surfaces.

The first LED unit 122 and the second LED unit 123 can be LED units of the same or different color. Moreover, the first LED unit 122 and the second LED unit 123 can each be an organic light-emitting diode (OLED) or an LED. A material of the mouse pad body 111 can be a cloth, a colloid, or a rubber. The control unit 121 can control a brightness, a flickering, and a change of color of each of the first LED unit 122 and the second LED unit 123. In other embodiments, the first LED unit 122 and the second LED unit 123 can each include a plurality of LEDs with different colors. Moreover, since the first LED unit 122 and the second LED unit 123 only emit lights when the voltage conversion unit 125 of the charging module 12 receives the first voltage V1, users can determine whether charging is available or not through determining whether the light guide unit 112 emits light or not.

In this embodiment, the affixing unit 132 is a clamping unit that is pivotally disposed on one side of the shell unit 131. The affixing unit 132 and the shell unit 131 jointly clamp the mouse pad body 111, so that the affixing unit 132 and the shell unit 131 are disposed on the affixing area 11A. The first wireless charging coil unit 124 is an inductive wireless charging coil, which requires the users to place the electronic device that is to be charged on the shell unit 131 so as to proceed with the charging.

Figure 6:
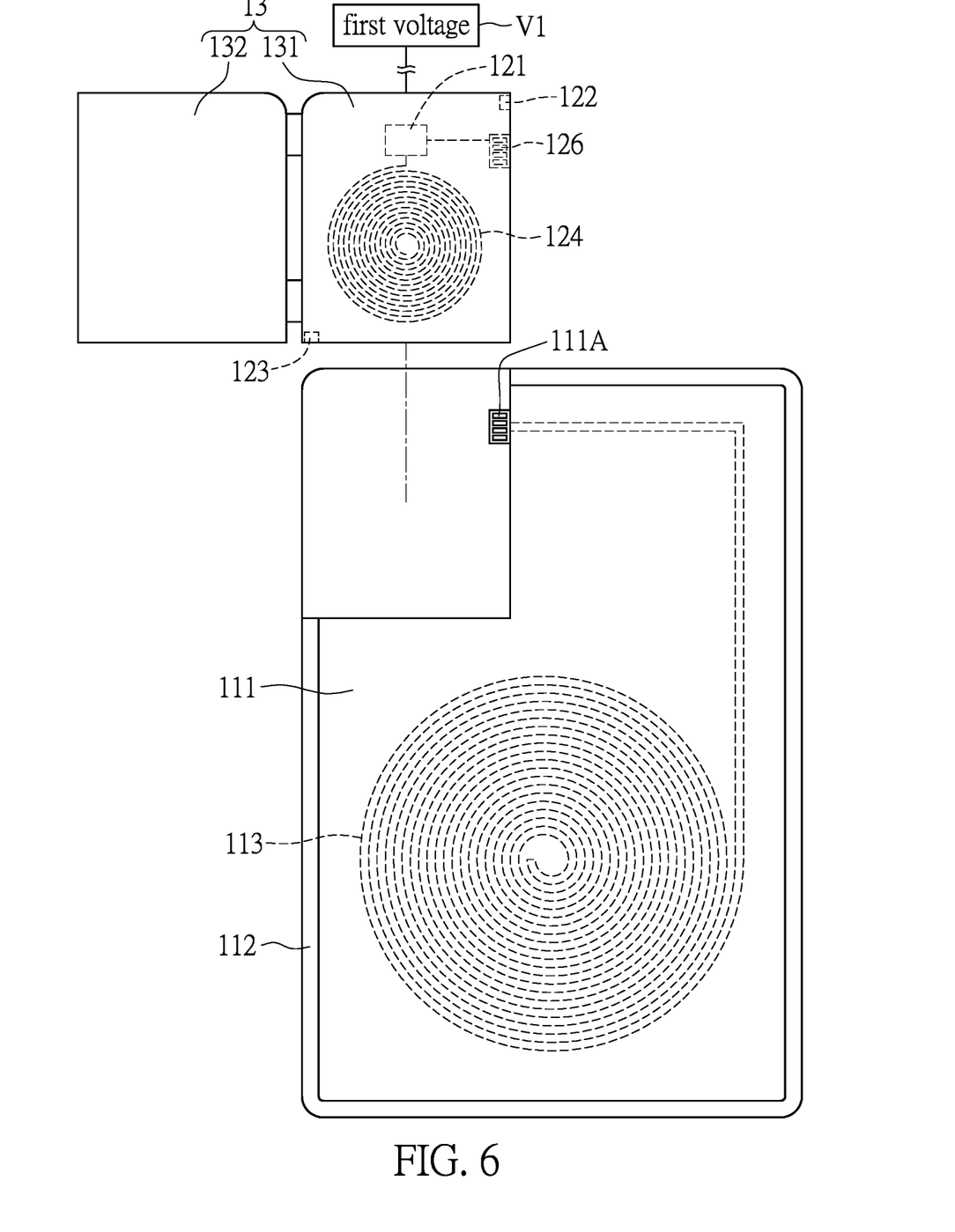
FIG. 6 is a schematic view of a charging coil disposed in the mouse pad module in one embodiment of the present disclosure.

Referring to FIG. 6, a schematic view of a charging coil disposed in the mouse pad module in one embodiment of the present disclosure is provided.

The mouse pad module 11 also includes a second wireless charging coil 113. The second wireless charging coil 113 is disposed in the mouse pad body 111.

In this embodiment, the charging module 12 further includes a first port 126. The first port 126 is electrically connected to the control unit 121 and the voltage conversion unit 125.

The mouse pad body 111 further includes a second port 111A. The second port 111A is electrically connected to the second wireless charging coil 113. The second port 111A is disposed at a position corresponding to the first port 126. When the shell module 13 is disposed on the affixing area 11A of the mouse pad body 111, the first port 126 and the second port 111A are connected to each other. In this embodiment, each of the first port 126 and the second port 111A includes at least one magnet with a weak magnetic field. When the first port 126 and the second port 111A are close to each other, the magnets with the weak magnetic field of the first port 126 and the second port 111A can be attracted to each other, so as to connect the first port 126 and the second port 111A to each other. Therefore, the second wireless charging coil 113 is electrically connected to the control unit 121 and the voltage conversion unit 125 through the first port 126 and the second port 111A, so as to receive the power provided by the voltage conversion unit 125.

The control unit 121 of the charging module 12 is able to simultaneously control whether the first wireless charging coil unit 124 and the second wireless charging coil 113 will charge the electronic device that is to be charged. That is to say, the control unit 121 of the charging module 12 is able to simultaneously provide power to the first wireless charging coil unit 124 and the second wireless charging coil 113. The control unit 121 of the charging module 12 is also able to only provide power to one of the first wireless charging coil unit 124 and the second wireless charging coil 113.

In other words, the control unit 121 is able to control the first wireless charging coil unit 124 and the second wireless charging coil 113 to be turned on and turned off, so as to save power. Moreover, since the charging module 12 is detachably disposed on the mouse pad module 11, the users are able to easily replace the mouse pad module 11 or the charging module 12 with another same or different component.

Figure 7:
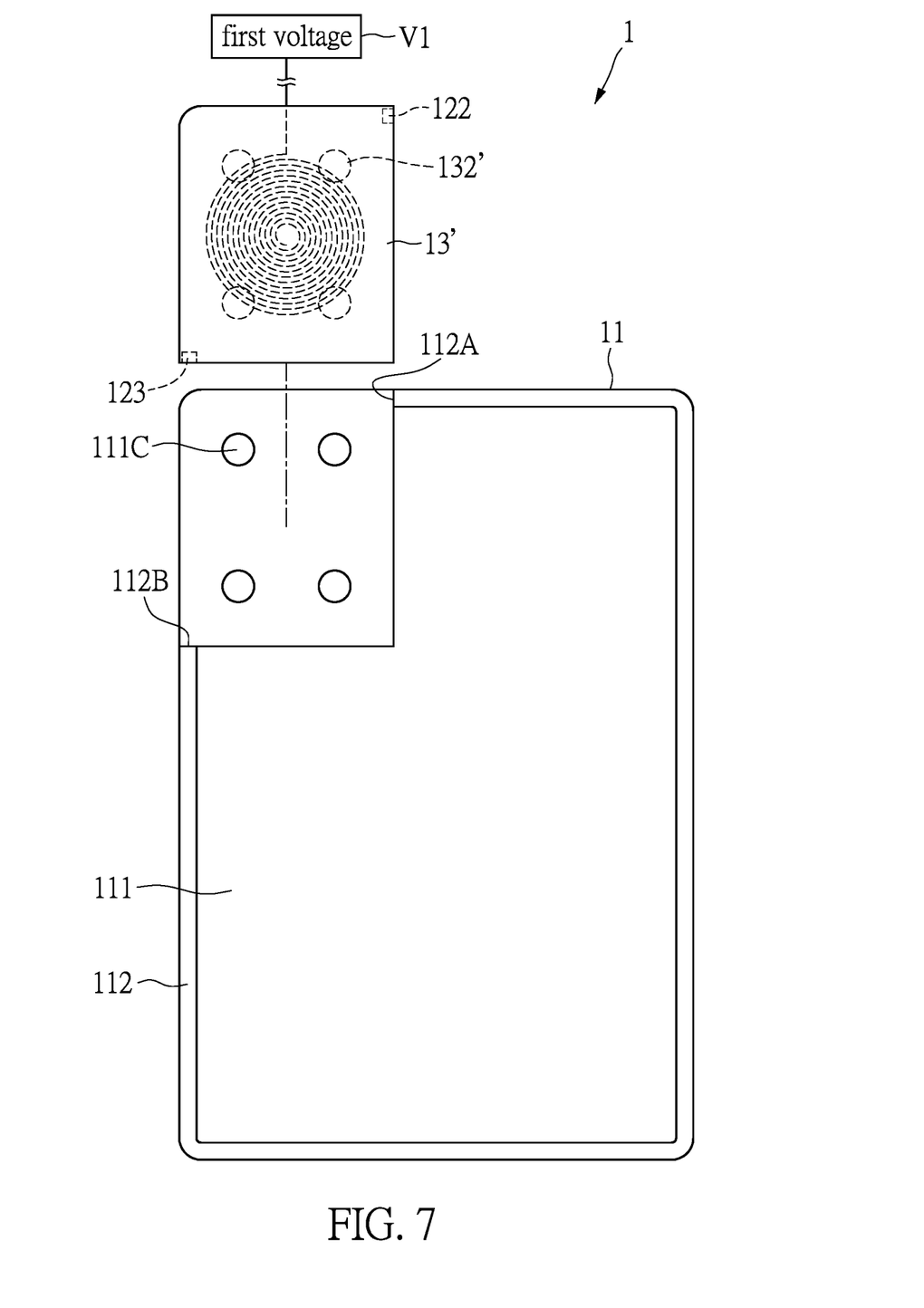
FIG. 7 is a schematic view of the mouse pad device in another embodiment of the present disclosure.

Referring to FIG. 7, a schematic view of the mouse pad device in another embodiment of the present disclosure is provided.

In this embodiment, the affixing unit 132' of the shell module 13 is a magnetic unit. The affixing unit 132' is disposed at one side of the shell unit 131 facing the mouse pad body 111. In other embodiments, the affixing unit 132' can be disposed on the two opposite sides of the shell unit 131. That is to say, either one of the sides of the shell unit 131 or one of the sides of the affixing unit 132 can be connected to the mouse pad body 111. The affixing unit 132' can include one or more magnets with the weak magnetic field. An area affixing unit 111C is disposed on the affixing area 11A of the mouse pad body 111. That is to say, the mouse pad body 111 includes at least one magnet with the weak magnetic field that is disposed on the affixing area 11A. Moreover, the area affixing unit 111C is disposed on a position corresponding to the affixing unit 132' of the shell unit 131. When the shell unit 131 of the shell module 13 is close to the affixing area 11A of the mouse pad body 111, the affixing unit 132' and the area affixing unit 111C can be attracted to each other, so that the shell unit 131 of the shell module 13 is fixedly disposed on the affixing area 11A of the mouse pad body 111.

Figure 8:
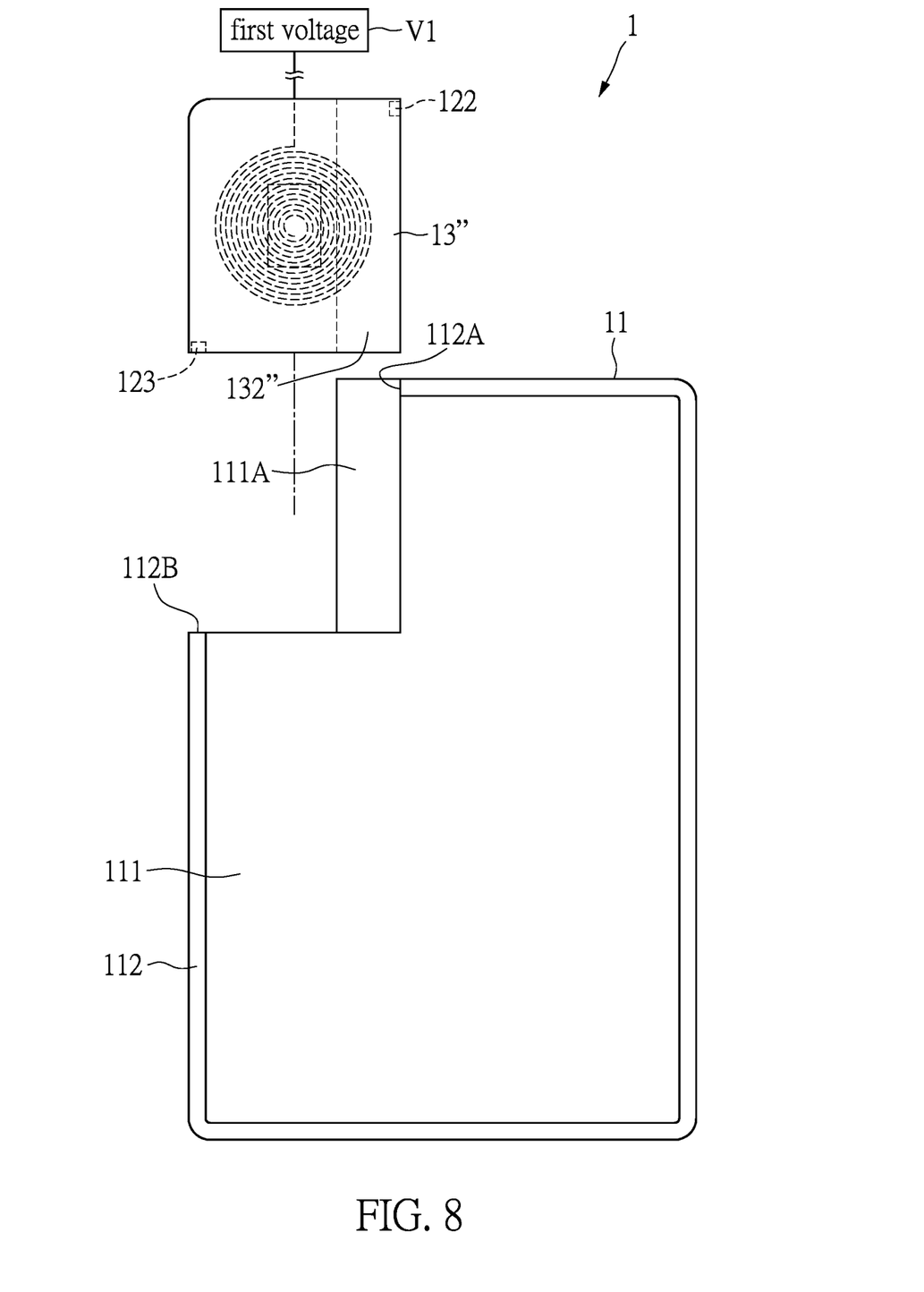
FIG. 8 is a schematic view of the mouse pad device in yet another embodiment of the present disclosure.

Referring to FIG. 8, a schematic view of the mouse pad device in yet another embodiment of the present disclosure is provided.

In this embodiment, the affixing unit 132" of the shell module 13 is a chute. That is to say, a groove is disposed under the shell unit 131, so as to accommodate the affixing area 11A of the mouse pad body 111. In this embodiment, the area of the affixing area 11A can be adjusted in accordance with the size of the area of the groove.

One of the advantages of the present disclosure is that the mouse pad module and the charging module of the mouse pad can be easily detached or replaced, which effectively increases the convenience. Moreover, the LED units of the charging module and the light guide unit of the mouse pad module also enhance the enjoyment and the aesthetic appearance of the mouse pad device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad device with a charging function, comprising:
   a mouse pad module including;
      a mouse pad body, the mouse pad body being flat-shaped; and
   a light guide unit surroundingly disposed on an edge of the mouse pad body, the light guide unit having a first light entering end and a second light entering end; and
   a charging module receiving a first voltage, the charging module including:
      a control unit;

a first light-emitting diode (LED) unit electrically connected to the control unit;

a second LED unit electrically connected to the control unit; and a first wireless charging coil unit electrically connected to the control unit; and a shell module including a shell unit and an affixing unit;

wherein the first wireless charging coil unit and the control unit are disposed in the shell unit, the first LED unit and the second LED unit are disposed on two sides of the shell unit and the shell module is detachably fixed on an affixing area of the mouse pad body by utilizing the affixing unit; and wherein when the shell module is disposed on the affixing area of the mouse pad body, the first LED unit and the second LED unit are respectively disposed at the first light entering end and the second light entering end of the light guide unit.

2. The mouse pad device according to claim 1, wherein the affixing unit is a clamping unit that is pivotally disposed on one side of the shell unit, and the affixing unit and the shell unit jointly clamp the mouse pad body, so that the affixing unit and the shell unit are disposed on the affixing area.

3. The mouse pad device according to claim 1, wherein the mouse pad module further includes a second wireless charging coil unit that is electrically connected to the control unit so as to receive power, and the second wireless charging coil unit is disposed in the mouse pad body.

4. The mouse pad device according to claim 1, wherein the affixing unit is a magnetic unit and the affixing area includes an area affixing unit, and the area affixing unit of the affixing area is disposed on a position corresponding to the affixing unit of the shell module.

5. The mouse pad device according to claim 1, wherein the affixing unit is a slide groove that accommodates the affixing area of the mouse pad body.

6. The mouse pad device according to claim 1, wherein the charging module further includes a voltage conversion unit that receives the first voltage, and the voltage conversion unit converts the first voltage into a wireless charging voltage that is provided to the first wireless charging coil unit.

7. The mouse pad device according to claim 1, wherein the light guide unit is a light guide bar.

8. The mouse pad device according to claim 1, wherein the light guide unit has a plurality of light guide patterns.

9. The mouse pad device according to claim 1, wherein the control unit controls a brightness, a flickering, and a change of color of each of the first LED unit and the second LED unit.

10. The mouse pad device according to claim 1, wherein each one of the first LED unit and the second LED unit includes a plurality of LED chips.

* * * * *

UNITED STATES PATENT AND TRADEMARK OFFICE
CERTIFICATE OF CORRECTION

PATENT NO. : 11,287,910 B2
APPLICATION NO. : 17/004003
DATED : March 29, 2022
INVENTOR(S) : Ho-Lung Lu It is certified that error appears in the above-identified patent and that said Letters Patent is hereby corrected as shown below:

On the Title Page

(71) Applicants should read: DEXIN ELECTRONIC LTD., Dongguan (CN); DEXIN CORPORATION, New Taipei (TW)

(73) Assignees should read: DEXIN ELECTRONIC LTD., Dongguan (CN); DEXIN CORPORATION, New Taipei (TW)

Signed and Sealed this
Seventh Day of June, 2022

Katherine Kelly Vidal
*Director of the United States Patent and Trademark Office*